United States Patent Office 3,095,391
Patented June 25, 1963

3,095,391
AMYLACEOUS GRAFT COPOLYMERS AND
PROCESS FOR PREPARING SAME
Charles E. Brockway, Reedus R. Estes, and David R. Smith, all of Decatur, Ill., assignors to A. E. Staley Manufacturing Company, Decatur, Ill., a corporation of Delaware
No Drawing. Filed Mar. 13, 1959, Ser. No. 799,108
11 Claims. (Cl. 260—17.4)

This invention relates to the preparation of graft copolymers of granular, unpasted starch and starchy materials. The term "graft" is taken to mean the modification of an existing polymer, in this case starch, by the addition of a different polymer at generally regular sites in the molecule of the existing polymer. It is commonly understood that the copolymer retains the basic properties of the existing polymer and adds to them the properties of the different polymer. In this way, the copolymer has a composite of the properties of the two copolymers. It sometimes is said that in this way copolymers may be "tailor-made" by selecting the basic polymer for its known properties and then grafting onto it a polymer having other selected properties, for example particular functional groups.

It is the object of this invention to provide a method for producing graft copolymers of granular starch and starchy materials and to provide a series of new products based on granular starch. Granular starch is by far the least expensive polymer available. Specific objects will appear in the following description.

The objects of this invention are attained, broadly speaking, by reacting a granular, unpasted amylaceous material (including native starch, modified native starch, and dextrins) with a vinylic monomer in the presence of an oxidizing catalyst. We believe, in accordance with the accepted theory of such reactions, that the catalyst must be of a type which forms free radical sites in the amylaceous material.

We are aware that previous investigators have experimented on the preparation of graft copolymers of naturally occurring carbohydrate polymers. However, to our knowledge experiments on starch were performed on starch solutions or pastes. In that work, it was disclosed, the starch was oxidized by passing an oxidizing gas containing ozone through the starch solution. In our invention, we exclude air from the reaction mixture, since we have found that oxygen is actually an inhibitor for the reaction in accordance with this invention. However, if enough of the catalyst is used, we have found in the experiments we performed that it is possible to override the inhibitory effect of the oxygen. Nevertheless, with some catalyst-monomer combinations, it may be practically impossible to overcome this effect of oxygen. It is for these practical reasons that air should be excluded from the reaction mixture.

Care must be taken in choosing a solvent for use in the method of our invention. Generally speaking, water is the best solvent primarily because of its cheapness and effectiveness. This is to say, that water should be the major constituent of the solvent used. For example, no graft copolymer was obtained when benzene was used alone as the reaction medium with carefully dried starch. We believe that other non-polar solvents have the same effect. The solvent appears to be necessary to promote contact among the various ingredients. For example if the monomer is a solid, a solvent must be used. In general, in our experiments, good results have been obtained when the solvent, the monomer or both wet the amylaceous material, i.e., penetrated the granules.

Water is especially valuable as a solvent because of its efficacy in promoting good contact among the reactants, particularly when catalysts are used that are water soluble. In some cases, for example when using sodium hypochlorite as catalyst, water is a necessary ingredient in the reaction mixture. It is not essential that there by any appreciable solubility of the monomer or catalyst in water, as will appear from the examples set forth hereafter.

The water content of the reaction mixture should be more than 10% by weight of the amylaceous material (dry substance basis). It is not necessary that an aqueous suspension be used. Native corn starch may have as much as 25% or more water and still appear dry in the visual and tactile sense; that is to say, it is superficially dry. We were able to obtain a graft copolymer even with such superficially dry starch when the water content was at least 10%.

In the usual practice of the method of this invention, an aqueous suspension of the granular amylaceous material is prepared and the monomer is added to it, care being taken to remove air from the suspension and to exclude air during the addition of the monomer. The catalyst, which may be dissolved in water, may be added before or after the monomer is added, and the polymerization reaction is carried out below the pasting temperature of the amylaceous materials. The catalysts for this purpose are of a type and concentration in the reaction mixture to establish mildly oxidizing conditions therein. Such catalysts are often referred to as initiators and include, among others, hydrogen peroxide, organic peroxides and hydroperoxides, and sodium hypochlorite. We have found that better yields are often obtained by adding in addition an activator for the oxidizing catalyst. The activator is a mild reducing agent and may be, for example, ferrous ion (in the form of ferrous ammonium sulfate) or sodium formaldehyde sulfoxalate. The activator may be added before the initiator is added or, when the initiator is added before the monomers, the addition of the activator may be delayed until the monomer has been added. If a limited conversion is desired, further polymerization may be prevented by the addition of a suitable stopping agent such as hydroquinone or others well known in the art. The product is recovered by methods used in the art of recovering starch derivatives.

The vinylic monomers for use according to this invention are unsaturated organic compounds containing the vinyl group. In such compounds, the vinyl group is available to undergo polymerization to produce polymers that are largely linear in character. Included among these compounds are styrene and substituted styrenes such as vinyl toluene and chlorostyrene; compounds having the acrylic group as the polymerizable nucleus, such as acrylic and methacrylic acids, and esters thereof (including the methyl, ethyl and butyl esters), acrylamide, acrylonitrile; vinyl chloride; vinyl acetate and other vinyl esters; vinyl pyridine and vinyl pyrrolidone; vinyl ketones; vinylidene compounds, such as vinylidene chloride; allylidene compounds such as allylidene diacetate; conjugated diene monomers such as butadiene-1,3,isoprene, chlorobutadiene-1,3 and so on. These are referred to herein as vinylic monomers.

The following examples illustrate our invention, but they should not be taken as limiting the invention to the details disclosed. In each of the detailed examples, unless otherwise stated, the granular starch was native corn starch. Concentrations are given in parts by weight or in weight percentages.

EXAMPLE 1

All of the samples included within this example were prepared in the following manner: A 12 oz. crown-capped bottle was cleaned, dried and then weighed to the nearest one-tenth gram. To the bottle 30 grams of granular unpasted starch (dry substance) was added together with 60 cubic centimeters of distilled water. The bottle was tightly capped and tumbled for about half an hour in a constant temperature bath maintained at 50° C. Then the bottle was removed from the bath, uncapped and the contents evacuated by means of a water aspirator to remove air. After de-aeration, the vacuum was broken with purified nitrogen and 14-15 grams of vinyl acetate was added. After each addition to the reaction mixture, the bottle was flushed with nitrogen and recapped. After all the monomer had been added, the polymerization catalyst was added and the bottle recapped.

The bottle containing the reactants was placed in the constant temperature bath (50° C.) and kept there for 16 hours. At the end of this time, one-tenth cubic centimeter of a 1% solution of hydroquinone in water was added. The bottle and its contents were then dried to constant weight in an air oven at 110° C. From the weight gained, the percentage conversion of the monomer was calculated.

Thereafter, 100 cubic centimeters of acetone was added. The bottle was again recapped and placed in the constant temperature bath (50° C.) for about 16 hours. At the end of this time, a small sample of the acetone solution was withdrawn and its refractive index determined. The concentration of resin in the solution was determined from a graph of concentration against refractive index. The graph was a straight line drawn between the refractive index of the pure solvent used to extract the homopolymer (acetone) and a solution of 5.0 grams of vinyl acetate polymer in 100 cubic centimeters of the solvent.

The results of these experiments are displayed in Table 1 in which the relative weight concentrations are given in parts per 100 parts of dry substance granular starch. In each case, there were 200 parts of water and 50 parts of monomer. The grafting efficiency is determined from the amount of resin extracted by the solvent compared to the amount of monomer added. This is an example of a vinylic monomer having a vinyl group substituted with an acyloxy group.

Table 1

| Initiator | Parts | Activator | Parts | Percent conversion | Graft efficiency |
|---|---|---|---|---|---|
| $K_2S_2O_8$ | 1.0 | $Na_2S_2O_5$ | 0.67 | 93 | 34 |
| $K_2S_2O_8$ | 1.0 | $Na_2S_2O_5$ | 1.3 | 100 | 21 |
| $K_2S_2O_8$ | 1.0 | $NaHSO_3$ | 0.67 | 94 | 19 |
| $K_2S_2O_8$ | 1.0 | $NaHSO_3$ | 1.3 | 100 | 10 |
| $K_2S_2O_8$ | 1.0 | FAS* | 0.67 | 100 | 3 |
| $K_2S_2O_8$ | 1.0 | FAS | 1.3 | 56 | 19 |
| 50% $H_2O_2$ | 1.0 | FAS | 0.67 | 100 | 32 |
| 50% $H_2O_2$ | 1.0 | FAS | 1.3 | 100 | 21 |
| 50% $H_2O_2$ | 1.0 | $NaHSO_3$ | 0.67 | 16 | 83 |
| 50% $H_2O_2$ | 1.0 | $Na_2S_2O_5$ | 0.67 | 15 | 100 |
| 50% $H_2O_2$ | 1.0 | $Na_2S_2O_5$ | 1.3 | 19 | 86 |

*Ferrous ammonium sulfate heptahydrate.

EXAMPLE 2

In the same manner as in Example 1, a series of graft copolymers of granular starch were prepared using ethyl acrylate in place of the vinyl acetate in Example 1. The extraction was performed with acetone. The results of these experiments are shown in Table 2. This is an example of a vinyl monomer in which the vinyl group is bound to a carbonyl group. In this case, the carbonyl group is part of an esterified carboxy group.

Table 2

| Initiator | Parts | Activator | Parts | Percent conversion | Graft efficiency |
|---|---|---|---|---|---|
| 50% $H_2O_2$ | 1.0 | FAS* | 0.67 | 100 | 41 |
| 50% $H_2O_2$ | 1.0 | FAS | 1.3 | 100 | 36 |
| 50% $H_2O_2$ | 1.0 | $NaHSO_3$ | 0.67 | 83 | 54 |
| 50% $H_2O_2$ | 1.0 | $NaHSO_3$ | 1.3 | 81 | 41 |
| 50% $H_2O_2$ | 1.0 | $Na_2S_2O_5$ | 0.67 | 96 | 45 |
| 50% $H_2O_2$ | 1.0 | $Na_2S_2O_5$ | 1.3 | 95 | 35 |

*Ferrous ammonium sulfate heptahydrate.

EXAMPLE 3

In the same manner as in Example 1, a series of graft copolymers of granular starch were prepared using styrene in place of the vinyl acetate of Example 1. In this case, the solvent used to extract homopolymer was benzene. The results of these experiments are shown in Table 3. This is an example in which the vinyl group of the monomer is substituted with a phenyl group.

Table 3

| Initiator | Parts | Activator | Parts | Percent conversion | Graft efficiency |
|---|---|---|---|---|---|
| $(NH_4)_2S_2O_8$ | 0.50 | $Na_2S_2O_5$ | 0.33 | 99 | 35 |
| $(NH_4)_2S_2O_8$ | 0.50 | $NaHSO_3$ | 0.33 | 99 | 35 |
| $(NH_4)_2S_2O_8$ | 0.50 | FAS* | 0.33 | 44 | 65 |
| 50% $H_2O_2$ | 0.50 | FAS | 0.33 | 93 | 54 |
| 50% $H_2O_2$ | 0.50 | $NaHSO_3$ | 0.33 | 46 | 73 |
| 50% $H_2O_2$ | 0.50 | $Na_2S_2O_5$ | 0.33 | 57 | 76 |

*Ferrous ammonium sulfate heptahydrate.

EXAMPLE 4

In the same manner as in Example 1, a series of graft copolymers of granular starch was prepared using methyl methacrylate in place of the vinyl acetate in Example 1. Acetone was the solvent used to extract the homopolymer. The results of these experiments are shown in Table 4. This is another example of a vinyl group, one of whose carbon atoms is linked to a carbonyl group.

Table 4

| Initiator | Parts | Activator | Parts | Percent conversion | Graft efficiency |
|---|---|---|---|---|---|
| $(NH_4)_2S_2O_8$ | 0.50 | $Na_2S_2O_5$ | 0.33 | 100 | 48 |
| $(NH_4)_2S_2O_8$ | 0.50 | $NaHSO_3$ | 0.33 | 100 | 50 |
| $(NH_4)_2S_2O_8$ | 0.50 | FAS* | 0.33 | 100 | 50 |
| $(NH_4)_2S_2O_8$ | 0.50 | FAS | 0.33 | 100 | 95 |
| 50% $H_2O_2$ | 0.50 | $NaHSO_3$ | 0.33 | 89 | 81 |
| 50% $H_2O_2$ | 0.50 | $Na_2S_2O_5$ | 0.33 | 94 | 81 |

*Ferrous ammonium sulfate heptahydrate.

EXAMPLE 5

This example illustrates the preparation of a graft copolymer of granular starch with higher alcohol esters of acrylic acids. The experiment was performed in a manner similar to that of Example 1 and in the same proportions, except that the butyl esters of acrylic and methacrylic acids were used. The results are tabulated in Table 5. Acetone was used as the extracting solvent. This example also illustrates some of the wide variety of initiators that are useful in this process; it will be noted that, with some initiators, e.g., cumene hydroperoxide, an activator was not necessary to obtain a good conversion although the conversion was improved with the activator present.

Table 5

| Initiator, parts; activator, parts | Butyl methacrylate | | Butyl acrylate | |
|---|---|---|---|---|
| | Percent conv. | Graft eff. | Percent conv. | Graft eff. |
| CHP,[1] 0.50; FAS,[2] 0.50 | 94 | 54 | 98 | 45 |
| CHP, 0.50 | 81 | 78 | 82 | 54 |
| DIBP,[3] 0.50; FAS, 0.50 | 95 | 37 | 100 | 39 |
| DIBP, 0.50 | 81 | 74 | 78 | 57 |
| p-MHP,[4] 0.50; FAS, 0.50 | 97 | 38 | 99 | 41 |
| p-MHP, 0.50 | 81 | 74 | 92 | 70 |
| DICUP,[5] 0.50; FAS, 0.50 | 61 | 66 | 47 | 55 |
| DICUP, 0.50 | 38 | 42 | 31 | 41 |
| t-BuHP,[6] 0.50; FAS, 0.50 | 90 | 60 | 94 | 53 |
| t-BuHP, 0.50 | 88 | 72 | 71 | 78 |
| $K_2S_2O_8$, 0.50; $Na_2S_2O_4$, 0.33 | 89 | 27 | 95 | 34 |

[1] Cumene hydroperoxide.
[2] Ferrous ammonium sulfate heptahydrate.
[3] Diisopropyl benzene hydroperoxide.
[4] para-Menthane hydroperoxide.
[5] Dicumyl peroxide.
[6] Tertiary butyl hydroperoxide.

EXAMPLE 6

This example illustrates the preparation of graft copolymers of granular starch using other acrylic monomers, in particular acrylonitrile and methacrylic acid. The procedure followed in the preparation of each of the samples was as follows: A resin kettle fitted with a paddle-type stirrer, a reflux condenser, a thermometer and a nitrogen inlet was used as the reaction chamber. About 100 grams of dry substance starch and 400 cubic centimeters of distilled water were added to the kettle. The starch and water were heated to a temperature of 30–35° C., while the reflux condenser was attached to a water aspirator to evacuate the reaction chamber and thereby eliminate air from the suspension. This was continued until the aqueous starch suspension had boiled for several minutes at a temperature of about 30–35° C.

Purified nitrogen was then added to the reaction chamber to break the vacuum. Next the activator (ferrous ammonium sulfate) was added and then the monomer. The temperature of the reaction chamber was then carefully adjusted to the desired value and the initiator (hydrogen peroxide) was added. For the methacrylic acid and acrylonitrile reactions, the initiators were 0.33 and 0.66 part of 50% hydrogen peroxide respectively, and the activator was 0.33 parts of ferrous ammonium sulfate heptahydrate in both cases.

The reaction was carried out at 30–40° C. The nitrogen atmosphere was maintained throughout the addition of the reagents and the course of the reaction. Then the mixture was filtered and the product was thoroughly washed by repeatedly slurrying with distilled water and filtering. The final filter cake was air dried at room temperature overnight or longer and its moisture content was determined by the weight loss on heating at 110° C. From the net weight of the product and the known starting weight of the starch, the weight of resin and the conversion of monomer were determined.

Extraction of homopolymeric methacrylic acid to determine the grafting efficiency was not performed because of the solubility of methacrylic acid polymers in water; i.e., it was assumed that the water used in polymerizing and washing would remove homopolymers. No extraction was performed on the acrylonitrile copolymer because of the insolubility of the homopolymer in common solvents.

Using 49 parts of methacrylic acid with a one-hour polymerization time, a conversion of 88% was obtained. The product consisted of 30% methacrylic acid polymer and 70% starch, or 43 parts of unextractable polymer per 100 parts of starch. In two runs with acrylonitrile, using 26 and 52 parts of the monomer with reaction time of 4–5 hours, 77 and 88% conversions were obtained, respectively, and the polymer contents of the products were 16 and 31%, respectively.

This example illustrates additional vinyl monomers. The methacrylic acid is exemplary of a vinyl group attached to a carbonyl (part of the carboxyl group); the acrylonitrile is illustrative of the vinyl group attached to a nitrile.

EXAMPLE 7

To illustrate the preparation of graft copolymers of granular starch and acrylamide, a series of samples was prepared using essentially the same procedure as that described for Example 6. The following proportions were used in all of these samples: 100 parts by weight of granular starch (dry substance), 250 parts by weight of water and variable concentrations of acrylamide and initiator as indicated in Table 7 (as parts by weight per 100 parts of dry substance starch). The temperature of all of the samples was 20–30° C., and the reaction time was 3 hours. The results obtained are indicated in Table 7. This exemplifies a vinyl monomer having the vinyl group attached to a carbonyl group with the carbonyl group in this case, being a part of an amido group.

Table 7

| Starch-acryl-amide ratio | Catalyst | | pH | Percent $H_2O$ | Percent N | Grafting | |
|---|---|---|---|---|---|---|---|
| | FAS* | 50% $H_2O_2$ | | | | Level | Eff. |
| 1.5 | 0.4 | .66 | 6.0–6.5 | 9.7 | 3.95 | 25.1 | 40 |
| 3.0 | 0.2 | .33 | 6.0–6.5 | 14.0 | 3.13 | 19.0 | 57 |
| 6.0 | 0.1 | .17 | 6.0–6.5 | 8.8 | 1.96 | 11.0 | 67 |
| 12.0 | 0.05 | .083 | 6.0–6.5 | 8.9 | 1.16 | 6.28 | 76 |
| 20.0 | 0.05 | .083 | 6.0–6.5 | 7.7 | 0.68 | 3.58 | 72 |
| 3.0 | 1.0 | 1.67 | 6.0–6.5 | 16.4 | 2.04 | 11.56 | 36 |
| 6.0 | .5 | .83 | 6.0–6.5 | 7.9 | 1.71 | 9.55 | 58 |
| 20 | .52 | .21 | 6.0–6.5 | 7.8 | 0.69 | 3.63 | 74 |
| 3.0 | 0.4 | 0.67 | 8.2 | 8.3 | 1.2 | 6.5 | 20 |
| 12.0 | 0.1 | 0.17 | 8.2 | 8.0 | 0.17 | 0.87 | 11 |

*Ferrous ammonium sulfate heptahydrate.

Table 7 also indicates the effects of the relative concentrations of the starch, acrylamide and catalyst (both initiator and activator).

The starch-acrylamide graft copolymers are useful as flocculants, as sizing compounds for synthetic fibers and paper, as adhesives and thickening agents. Their value is believed to be based on the water solubility of the grafted chains of polyacrylamide.

Similar results were also obtained with a granular hypochlorite-oxidized corn starch, with a granular acid-modified corn starch, with a granular corn starch modified by reaction with ethylene oxide, as described hereafter, with a granular starch modified by reaction with vinyl acetate, as described hereafter, and with a granular waxy corn starch. It was found, in using the hydrogen peroxide-ferrous ion catalyst, that the reaction is favored by an acidity that is about neutral or slightly acid (about 4 to 7.5 pH).

In using p-menthane hydroperoxide as catalyst, it was found that a better yield was obtained when the catalyst was added after rather than before the monomer. On the other hand, the order of addition when hydrogen peroxide was used had little or no effect on the yield.

Still other catalysts were used in reacting granular starch with acrylamide to produce a graft copolymer. These are indicated in Table 7a which includes, for comparison, another result with peroxide-ferrous ion. The proportions by weight of the ingredients were: 100 parts dry substance starch, 50 parts acrylamide, and 330 parts water. The reaction conditions were 50° C. for 16 hours.

Table 7a

| Catalyst—Initator, parts; activator, parts | Percent conversion |
|---|---|
| $(NH_4)_2S_2O_8$, 0.50; $Na_2S_2O_5$, 0.33 | 89 |
| $(NH_4)_2S_2O_8$, 0.50; $NaHSO_3$, 0.33 | 96 |
| $(NH_4)_2S_2O_8$, 0.50; FAS,* 0.33 | 96 |
| $(NH_4)_2S_2O_8$, 0.50; $Na_2S_2O_4$, 0.33 | 57 |
| 50% $H_2O_2$, 0.50; FAS, 0.33 | 103 |
| 50% $H_2O_2$, 0.50; $Na_2S_2O_5$, 0.33 | 40.5 |
| 50% $H_2O_2$, 0.50; none | 57 |
| Cumene hydroperoxide, 0.50; FAS, 0.33 | 95.5 |
| Dicumyl peroxide, 0.50; none | 30 |
| Benzoyl peroxide, 0.50; none | 17.5 |
| $K_2S_2O_8$, 0.50; none | 102 |
| $K_2S_2O_8$, 0.50; $Na_2S_2O_4$, 0.33 | 74 |
| Tertiary-butyl hydroperoxide, 0.5; none | 37 |
| Tertiary-butyl hydroperoxide, 0.5; FAS, 0.33 | 90 |
| Diisopropylbenzene hydroperoxide, 0.50; FAS, 0.33 | 52 |

*Ferrous ammonium sulfate heptahydrate.

EXAMPLE 8

This example is intended to illustrate further some of the wide variety of initiators that may be used in preparing graft copolymers. In each of the samples, the procedure of Example 1 was used with 100 parts by weight of granular starch, 200 parts by weight of water, and 50 parts by weight of ethyl acrylate. The polymerization conditions were 16 hours at 50° C. The results obtained are indicated in Table 8.

Table 8

| Initiator, parts; activator, parts [1] | Percent conversion | Grafting efficiency [2] |
|---|---|---|
| CHP, 0.50; FAS, 0.50 | 78 | 10 |
| CHP, 0.50; none | 70 | 30 |
| DIBP, 0.50; FAS, 0.50 | 68 | 14 |
| DIBP, 0.50; none | 51 | 3 |
| p-MHP, 0.50; FAS, 0.50 | 94 | 26 |
| p-MHP, 0.50; none | 55 | 10 |
| DICUP, 0.50; FAS, 0.50 | 20 | 66 |

[1] CHP—cumene hydroperoxide. DIBP—diisopropyl benzene hydroperoxide. p-MHP—para-menthane hydroperoxide. DICUP—dicumyl peroxide. t-BHP—t-butyl hydroperoxide. FAS—ferrous ammonium sulfate heptahydrate.
[2] As determined by acetone extraction of oven-dried product.

We also found that the following compounds are effective as catalysts for the formation of graft copolymers of granular starch: benzoyl peroxide, ceric sulfate, potassium permanganate and especially sodium hypochlorite. The ferrous ion activator for hydrogen peroxide may be replaced by ascorbic acid (so long as there is a trace of iron present) or by sodium formaldehyde sulfoxalate $$(CH_2OH \cdot SO_2Na \cdot 2H_2O)$$

EXAMPLE 9

This example illustrates further the effect of varying the concentrations of one of the preferred catalysts, that is, hydrogen peroxide and ferrous ammonium sulfate. In all of the samples the method of preparation followed was that of Example 1, and 100 parts by weight of granular starch was used with 200 parts of water. The polymerization of reaction mixture was maintained at 50° C. for 16 hours. The monomer used was methyl methacrylate and the product was extracted with acetone to determine the grafting efficiency. It will be noted that, while there is a substantial conversion and a high grafting efficiency in the presence of hydrogen peroxide alone, the presence of the ferrous ion as activator for the peroxide produces a substantial improvement in the percentage of conversion.

Table 9

| Parts | | | Percent conversion | Grafting efficiency |
|---|---|---|---|---|
| Monomer | 50% $H_2O_2$ | FAS [1] | | |
| 50 | 0.50 | 0.33 | 100 | 97 |
| 50 | 2.50 | 1.67 | 100 | 83 |
| 50 | 2.50 | 0.33 | 100 | 64 |
| 50 | 0.50 | 1.67 | 100 | 76 |
| 50 | 0.33 | 0.50 | 100 | 97 |
| 27 | 0.50 | 0.33 | 100 | 95 |
| 53 | 0.50 | 0.33 | 100 | 100 |
| 107 | 0.50 | 0.33 | 100 | ------ |
| 50 | 0.50 | ------ | 63 | 96 |
| 50 | 0.50 | 0.33 | 100 | 90 |
| 50 | 1.50 | ------ | 65 | 84 |

[1] Ferrous ammonium sulfate heptahydrate.

EXAMPLE 10

This example illustrates the use of sodium hypochlorite as catalyst in preparing graft copolymers of granular starch and vinylic monomers. Each of the samples was prepared following the procedure of Example 6, using 20 grams of granular starch and 20 grams of methyl methacrylate. Polymerization time and temperature were 3½ hours and 30° C. respectively. The sodium hypochlorite solution added as catalyst contained 0.099 gram of chlorine per milliliter and required 4.1 mls. of 0.1 normal hydrochloric acid to neutralize one milliliter of hypochlorite solution. The results of the copolymerization are indicated in Table 10. Extraction of the dried granular product with ethylene dichloride demonstrated that most of the polymerized methyl methacrylate was not extractable and was therefore bound to the starch.

Table 10

| Distilled water, ml. | Sodium hypochlorite solution, ml. | Percent conversion |
|---|---|---|
| 100 | 0 | 0 |
| 99 | 1 | 0 |
| 95 | 5 | 73.5 |
| 90 | 10 | 84.0 |
| 75 | 25 | 76.5 |
| 50 | 50 | 66.5 |

EXAMPLE 11

This example illustrates the use of ceric ion (tetravalent) as a catalyst in the preparation of graft copolymers of granular starch and a vinylic monomer. The procedure followed was essentially that of Example 6. All of the samples indicated in Table 11 were prepared with 20 grams of granular starch, 20 grams of methyl methacrylate and ½ gram of ceric sulfate (water-free basis). The time and temperature of polymerization were 22 hours and 20° C., respectively.

As an alternative to the ceric sulfate-sulfuric acid solution, an aqueous solution of ceric ammonium nitrate may be employed. The latter is often preferable since the nitrate compound, although more expensive, is stable in water. A series of experiments was performed to compare the ceric sulfate-sulfuric acid catalyst to ceric ammonium nitrate. In these samples 32.4 grams of granular starch and 20 grams of methyl methacrylate were copolymerized for 20 hours at 20° C. The results obtained in this series of samples are indicated in Table 12. The percentage conversion was determined in the manner already described. In this case, extraction with ethylene dichloride demonstrated that most of the polymerized methyl methacrylate was grafted on the starch.

Table 11

| Distilled water, ml. | $H_2SO_4$ added | Percent conversion |
|---|---|---|
| 50 | 50 ml. 0.00N | 98.5 |
| 50 | 50 ml. 0.12N | 97.0 |
| 50 | 50 ml. 0.25N | 92.5 |
| 50 | 50 ml. 0.50N | 88.5 |

Table 12

| Initial $H_2O$, ml. | Milliliters 0.1M ceric solution | Percent conversion |
|---|---|---|
| 590 | 10 sulfate | 100 |
| 500 | 100 sulfate | 91 |
| 350 | 250 sulfate | 72 |
| 100 | 500 sulfate | 57 |
| 100 | 500* | 0 |
| 590 | 10 nitrate | 99.5 |
| 500 | 100 nitrate | 100 |
| 350 | 250 nitrate | 100 |
| 100 | 500 nitrate | 100 |

*0.6N $H_2SO_4$; no ceric ion present.

Substantially all of the foregoing examples have been directed to the reaction of granular native corn starch. However, the invention is not so limited. We have prepared copolymers of granular starches of waxy corn, tapioca, rice, potato and wheat and of potato amylose and potato amylopectin. We have also prepared copolymers of the following chemically modified, granular unpasted starches:

(1) Oxidized granular starch prepared by oxidizing granular starch with sodium hypochlorite.
(2) Acid-modified granular starch prepared by heating an acidified aqueous suspension of granular starch below the pasting temperature.
(3) Granular starch modified by reaction with ethylene oxide to form a hydroxyethyl ether of starch in accordance with the methods of Patent Numbers 2,516,632, 2,516,633, and 2,516,634.

(4) Granular starch modified by reaction with vinyl acetate in the presence of water in accordance with the methods of application Serial No. 661,032, filed May 23, 1957, for J. V. Tuschhoff and C. E. Smith, now abandoned.

We have also prepared copolymers of dextrins, but care must be used with dextrins to avoid gelatinizing them in the water used in the reaction mixture. Accordingly, the class of unpasted starchy materials within the scope of this invention includes native starch, dextrins and chemically modified native starch. The last includes modified starch often referred to as a derivative of starch. We have used the term granular unpasted amylaceous material to include all of these.

EXAMPLE 12

This example illustrates the preparation of graft copolymers of granular starch with a vinylic monomer in which the vinyl group is attached to a heterocyclic amine, in particular to pyridine and to pyrrolidone. Other members of this group are the vinyl lutidines, picolines, pyrroles and substituted pyrroles. The experiments, indicated in Table 13, were conducted in 32-ounce crown-cap bottles using 100 grams of a hypochlorite-oxidized starch (dry substance), 300 milliliters of water, 0.1 gram of ferrous ammonium sulfate heptahydrate and 0.2 gram of the initators shown in the table. After separation, the products were analyzed for nitrogen, then pasted in water, precipitated with alcohol and again analyzed for nitrogen. The retained nitrogen content clearly demonstrates the grafting of the polymer to the starch.

Table 13

| Monomer | Initiator | Nitrogen in product Percent | Nitrogen in product Percent of theoretical | Percent N retained after pasting |
|---|---|---|---|---|
| 4-vinyl pyridine | 50% H₂O₂ | 0.10 | 25 | 100 |
| Do | Teritiary-butyl hydroperoxide | 0.11 | 28 | 100 |
| 2-vinyl pyridine | 50% H₂O₂ | 0.21 | 53 | 95 |
| N-vinyl-2-pyrrolidone | Tertiary-butyl hydroperoxide | 0.27 | 68 | 89 |
| Do | 50% H₂O₂ | 0.16 | 39 | 75 |

These copolymers are readily handled and treated in the same manner as granular starch. The extent of grafting is equivalent to about one monomeric unit for each 15 to 30 glucose units. These copolymers have cationic exchange properties which may be enhanced by quaternizing the tertiary amine group. For example, a graft copolymer of the granular ethylene oxide-modified starch and 2-vinyl pyridine (10 grams) was slurried in 100 milliliters of water and treated with 6 milliliters of dimethyl sulfate to quaternize the amino copolymer. The product was separated by filtering, washing and drying, and its ion-exchange properties were enhanced by the quaternization.

EXAMPLE 13

This example illustrates the preparation of other graft copolymers of amylaceous materials that have ion exchange properties. All of the samples indicated in Table 14 were prepared using a hypochlorite-oxidized starch (32.4 grams dry substance) and 2 milliliters of diethylamino-ethyl methacrylate and a small amount of glacial acetic acid, as indicated in the table. The catalyst is given in grams per hundred grams of monomer. The grafting level is given in terms of grams of grafted polymer attached to 100 grams of the starch. The temperature of reaction was 50° C. and the procedure paralleled that of Example 1 except that the activator, ferrous ammonium sulfate, was added before the monomer and initiator. The same care was used to exclude oxygen.

Table 14

| FAS [1] | 50% H₂O₂ | AcOH, ml. | Grafting level [2] |
|---|---|---|---|
| 2.7 | 5.4 | 1.0 | 3.8 |
| 2.7 | 10.8 | 1.0 | 3.8 |
| 2.7 | 21.6 | 1.0 | 3.3 |
| 2.7 | 43.2 | 1.0 | 3.0 |
| 5.4 | 5.4 | 1.0 | 3.7 |
| 5.4 | 10.8 | 1.0 | 3.7 |
| 5.4 | 21.6 | 1.0 | 3.7 |
| 5.4 | 43.2 | 1.0 | 2.9 |
| 5.4 | 108 | 1.0 | 2.0 |
| 2.7 | 21.6 | 0.5 | 3.6 |
| 2.7 | 21.6 | 1.0 | 3.7 |
| 2.7 | 21.6 | 2.0 | 1.2 |

[1] Ferrous ammonium sulfate heptahydrate.
[2] Based on nitrogen analysis.

In a series of experiments, using buffered reaction mixtures, it was noted that the reaction between granular starch and the monomer diethylaminoethyl methacrylate is favored by maintaining the aqueous reaction medium neutral or slightly acidic (a pH of 5 or more). It was found that the reaction is essentially complete in one hour.

In another series of experiments, the diethylaminoethyl methacrylate was reacted with dimethyl sulfate in aqueous solution at 10–15° C. using the procedure of U.S. Patent 2,831,781 (Upson and Webers) to produce the quaternary ammonium compound. The quaternary ammonium monomer was reacted with a variety of granular amylaceous materials including native corn starch, hypochlorite-oxidized corn starch, an aqueous-acid-modified, thin-boiling starch and the starch-ethylene oxide reaction product described above. These are designated A, B, C and D, respectively, in Table 15. In these experiments, 75 grams of dry substance amylaceous material, 200 milliliters of water and 10 grams of the tertiary monomer (before quaternization) were used. The reaction was carried out for 20 hours at 50° C.

Table 15

| Starch | Monomer | Initiator, parts; activator, parts | Percent [2] nitrogen |
|---|---|---|---|
| A | Diethylamino-ethyl methacrylate | FAS,[1] 0.10; 50% H₂O₂, 0.20. | 0.15 |
| B | do | FAS, 0.10; 50% H₂O₂, 0.20. | 0.14 |
| C | do | FAS, 0.10; 50% H₂O₂, 0.20. | 0.13 |
| D | do | FAS, 0.10; 50% H₂O₂, 0.20. | 0.32 |

[1] Ferrous ammonium sulfate heptahydrate.
[2] Based on original product.

EXAMPLE 14

This example illustrates the preparation of graft copolymers of granular starch modified by esterifying hydroxyl groups of the starch with an acid group having a polymerizable structure. Samples of starch maleate and starch methacrylate were prepared following generally the method of Patent Number 2,461,139, issued February 8, 1949. In detail, 0.88 mole of maleic anhydride was reacted with 6.25 moles of granular starch suspended in about 1.6 liters of water at a temperature of 10–20° C., the pH being maintained at about 9.0 with 3% sodium hydroxide additions during the course of the reaction. The product was filtered, washed and air-dried. The product had a saponification number of 49.8, an acid number (after conversion of sodium salt to free acid) of 24.4, and an ash content (sulfated) of 0.12%. The calculated degree of substitution was 0.08. The methacrylate compound was prepared the same way, using 1.0 mole of granular starch and 0.34 mole methacrylic anhydride. This product had a calculated degree of substitution of 0.3, based on a saponification number of 44.0, an acid number of 1.3 and an ash content (sulfated) of 0.04%. These starch esters were reacted with the monomers indicated in Table 16 following the procedure of Example 1. The reactants were in the ratio 100 parts starch, 200 parts water, and 50 parts monomer. Reaction time was 16 hours at 50° C. The results obtained are included in Table 16.

*Table 16*

STARCH MALEATE

| Sample | Monomer | Initiator, parts; activator, parts | Percent conv. | Graft eff. |
|---|---|---|---|---|
| 1 | Styrene | $(NH_4)_2S_2O_8$, 0.50; $Na_2S_2O_5$, 0.33 | 96 | 57 |
| 2 | do | $(NH_4)_2S_2O_8$, 0.50; FAS*, 0.33 | 89 | 29 |
| 3 | do | 50% $H_2O_2$, 0.50; $Na_2S_2O_5$, 0.33 | 68 | 98 |
| 4 | do | 50% $H_2O_2$, 0.50; FAS, 0.33 | 100 | 72 |
| 5 | Methyl methacrylate | $(NH_4)_2S_2O_8$, 0.50; $Na_2S_2O_5$, 0.33 | 100 | 90 |
| 6 | do | $(NH_4)_2S_2O_8$, 0.50; FAS, 0.33 | 100 | 89 |
| 7 | do | 50% $H_2O_2$, 0.05; $Na_2S_2O_5$, 0.33 | 97 | 100 |
| 8 | do | 50% $H_2O_2$, 0.50; FAS, 0.33 | 100 | 94 |
| 9 | Butyl methacrylate | 50% $H_2O_2$, 0.50; FAS, 0.33 | 81 | 29 |
| 10 | Butyl acrylate | 50% $H_2O_2$, 0.60; FAS, 0.24 | 97 | 81 |

STARCH METHACRYLATE

| | | | | |
|---|---|---|---|---|
| 11 | Methyl methacrylate | $(NH_4)_2S_2O_8$, 0.46; $Na_2S_2O_5$, 0.30 | 97 | 74 |
| 12 | Butyl acrylate | 50% $H_2O_2$, 0.60; FAS, 0.24 | 89 | 88 |

*Ferrous ammonium sulfate heptahydrate.

It was noted that the inclusion of the unsaturated groups in the starch produced a substantially higher grafting efficiency than that produced with unmodified starch under the same conditions. This is particularly true of styrene. The results obtained in this experiment were surprising in this respect. It is well known, of course, that maleic esters readily form copolymers with other vinylic monomers. Accordingly a much greater increase in grafting efficiency might be and was, in fact, expected. The fact that the grafting efficiency did not increase to the extent expected is evidence that a substantial proportion of the grafting took place at sites on the starch "backbone."

EXAMPLE 15

This example illustrates our preferred mode of performing the reaction in accordance with our invention. The equipment comprises a suitable container fitted with an agitator, a reflux condenser, an inlet for nitrogen, or other inert gas such as argon, helium, etc., and an inlet for reagents. The container is adapted to be evacuated through the reflux condenser, for example, by means of a water aspirator. About 100 parts (dry substance) of starch and 400 parts of water are charged to the container. The starch and water are agitated while the container is being evacuated until the aqueous suspension of starch has boiled for several minutes. Next, the line to the vacuum pump is closed and purified nitrogen is added to the reaction container above the surface of the liquid, the pressure being just sufficient to maintain the nitrogen atmosphere and prevent leakage of air inward. Next, the initiator is added, ferrous ammonium sulfate heptahydrate (0.33 part) for example. Following this, the monomer is added, still maintaining the nitrogen atmosphere. For example, 52 parts of methyl methacrylate might be used. Finally, the initiator, for example, 0.50 part of 50% hydrogen peroxide is added. The reaction mixture is thoroughly stirred while maintaining the nitrogen atmosphere above the liquid.

In a typical case, the temperature of the reaction mixture might rise from 25° C. to 40° C. in a few minutes and thereafter slowly decline. It was found that under certain conditions, with granular native starch, there is some thickening of the reaction mixture initially, but on continued stirring the mixture becomes thin again. However, the thickening can be avoided by adding only part of the monomer at the start of the reaction and adding the remainder after the addition of the initiator over a period of 30–60 minutes.

The reaction mixture is agitated for a period of time that depends upon the particular reactants and catalyst; about 2 to 3 hours is usually sufficient. Then the mixture is filtered, and the solid product washed thoroughly, as by slurrying with water. The solid product is air dried at room temperature for overnight or longer. Using the exemplary reactants, catalyst and proportions described in this example, and with a temperature in the range of 19–29° C. and reaction time of 2.3 hours with a granular, hypochlorite-oxidized corn starch, the product had a polymer content of 32% of which 99% was not extractable with acetone. The net polymer content of the product was, accordingly, 49 parts of engrafted polymer per 100 parts of starch.

The utility of the copolymers in accordance with this invention is manifold. The products are useful in adhesives, in textile finishing, in textile sizing, in flocculation, in paper making as binders and filler retention aids. Some are moldable thermoplastic materials. In all cases, the pasting properties of the original starch are modified so that it is possible to tailor the products to suit particular applications. When the engrafted polymer is hydrophilic, for example, polyacrylamide, the copolymer is readily pasted in water. When the engrafted polymer is hydrophobic, for example, polymethyl methacrylate, the pasting property of the granular starch is inhibited and, in fact, unless the engrafted polymer content is low, such copolymers do not paste in water. Pastes even of low graft content have higher viscosities than those of the parent starch. These altered pasting properties are useful in many processes where the viscosity of the starch paste is of importance, e.g., in adhesives. On the other hand, while not gelatinizable, the copolymer of native corn starch and an equal weight of polymerized methyl methacrylate is a moldable thermoplastic solid.

The graft copolymerization in accordance with this invention was identified and distinguished from the formation of a mixture of starch and homopolymer by several tests. Extraction of the product with well known solvents for the homopolymer left substantial quantities (sometimes all) of the engrafted polymer in the insoluble starch fraction.

In several tests, the copolymer granules were ruptured by pasting in dimethyl sulfoxide which is a solvent for both the starch and resin used; then the solutions were subjected to treatment with excess methanol to precipitate both starch and polymer. The precipitates were washed, dried, ground and then extracted with ethylene dichloride or other appropriate nonpolar solvent in which starch is normally insoluble. The soluble fractions included significant amounts of starch in addition to the resins, as demonstrated by infra-red analyses and carbon-hydrogen determinations. These results indicate a substantial modification of the parent starch.

Copolymers of granular starch and methyl methacrylate were subjected to vigorous acid hydrolysis by refluxing with 1.0 normal hydrochloric acid. The dried hydrolyzed product retained the superficial appearance of the granular copolymer but the birefringence had been eliminated and the refractive index changed. This is evidence that the engrafted polymer was distributed throughout the starch granule.

Since many embodiments of this invention may be made and since many changes may be made in the embodiments described, the foregoing is to be interpreted as illustrative only and our invention is defined by the claims appended hereafter.

We claim:

1. The method of producing a chemically modified granular starch of altered paste characteristics that comprises reacting, (1) a material selected from the group consisting of granular, unpasted starch in aqueous suspension and superficially dry, granular unpasted starch containing at least 10% water, and (2) ethylenically unsaturated monomer that polymerizes by addition polymerization, in the presence of a peroxidic free-radical catalyst at a temperature below the gelatinization temperature of said starch, maintaining said material in its granular form throughout the reaction and separating in the physical form of the original starch a product that is filterable from its aqueous suspensions.

2. The method of claim 1 in which the monomer is an ester of an alpha, beta-unsaturated monocarboxylic acid.

3. The method of claim 2 in which the monomer is an ester of an alkanol of 1 to 4 carbon atoms with acrylic acid.

4. The method of claim 3 in which the monomer is an ester of an alkanol of 1 to 4 carbon atoms with methacrylic acid.

5. The method of claim 1 in which the monomer is acrylamide.

6. The method of claim 1 in which the monomer is acrylic acid.

7. The product of the method of claim 1.

8. The product of claim 7 in which the monomer is an ester of an alkanol of 1 to 4 carbon atoms with acrylic acid.

9. The product of claim 7 in which the monomer is an ester of an alkanol of 1 to 4 carbon atoms with methacrylic acid.

10. The product of claim 7 in which the monomer is acrylamide.

11. The product of claim 7 in which the monomer is acrylic acid.

References Cited in the file of this patent

UNITED STATES PATENTS

| | | |
|---|---|---|
| 2,473,929 | Wilson | June 21, 1949 |
| 2,508,341 | Wilson | May 16, 1950 |
| 2,662,866 | Bristol et al. | Dec. 15, 1953 |
| 2,922,768 | Mino et al. | Jan. 26, 1960 |

FOREIGN PATENTS

| | | |
|---|---|---|
| 715,194 | Great Britain | Sept. 8, 1954 |
| 733,093 | Great Britain | July 6, 1955 |